United States Patent
Zhu

[19]

[11] Patent Number: 5,956,723
[45] Date of Patent: Sep. 21, 1999

[54] MAINTAINING IDENTIFIER INFORMATION IN A MEMORY USING UNIQUE IDENTIFIERS AS A LINKED LIST

[75] Inventor: Jieming Zhu, Wichita, Kans.

[73] Assignee: LSI Logic Corporation, Milpitas, Calif.

[21] Appl. No.: 08/822,625

[22] Filed: Mar. 21, 1997

[51] Int. Cl.$^6$ ....................................................... G06F 17/30
[52] U.S. Cl. ........................... 707/100; 707/101; 707/103
[58] Field of Search .............................. 707/10, 100, 101, 707/102, 103, 104, 1, 205, 200; 395/182.03, 830, 710, 200.53, 115, 200.54, 200.68, 703, 824; 711/103

[56] References Cited

U.S. PATENT DOCUMENTS

| | | | |
|---|---|---|---|
| 4,677,611 | 6/1987 | Yanosy, Jr. et al. ..................... | 370/401 |
| 4,855,905 | 8/1989 | Estrada et al. ..................... | 395/200.76 |
| 5,379,391 | 1/1995 | Belsan et al. ............................. | 711/114 |
| 5,414,851 | 5/1995 | Brice, Jr. et al. ........................ | 395/674 |
| 5,423,043 | 6/1995 | Fitzpatrick et al. .................... | 395/683 |
| 5,446,889 | 8/1995 | Prestifilippo et al. .................. | 707/100 |
| 5,519,695 | 5/1996 | Purohit et al. .......................... | 370/352 |
| 5,535,373 | 7/1996 | Olnowich ................................. | 395/500 |
| 5,581,765 | 12/1996 | Munroe et al. .......................... | 395/677 |
| 5,590,313 | 12/1996 | Reynolds et al. ....................... | 395/500 |
| 5,592,472 | 1/1997 | Grant et al. .............................. | 370/351 |
| 5,592,594 | 1/1997 | Cahoon .................................... | 395/115 |
| 5,598,541 | 1/1997 | Malladi .................................... | 395/286 |
| 5,671,406 | 9/1997 | Lubbers et al. ............................. | 707/7 |
| 5,732,282 | 3/1998 | Provino et al. .......................... | 395/830 |
| 5,745,727 | 4/1998 | Chau et al. ............................... | 711/122 |

*Primary Examiner*—Wayne Amsbury
*Assistant Examiner*—Srirama Channavajjala
*Attorney, Agent, or Firm*—Wayne P. Bailey; Alan W. Young

[57] ABSTRACT

A method for maintaining login service parameters includes a step of allocating space for and storing a login service parameter portion of a logged in port. A login service parameter of a logged in port is then compared with stored login service parameter structures. If the login service parameter of the logged in port, except for a login service parameter portion thereof, is identical with one of the stored login service parameters, a step of adding a first pointer to that stored login service parameters structure into the stored login service parameter portion structure is carried out. A new login service parameter portion structure is allocated and the process repeated, thereby creating a linked list of login service parameter portion structures, each login service parameter portion structure pointing to both the stored login service parameter structure and to a next login service parameter portion structure. If a logged in port login service parameter, except for a login service parameter portion thereof, is not identical with any of the stored login service parameters, a step of designating a login service parameter structure in memory for the logged in port is carried out, followed by a step of writing the logged in port login service parameter into the designated login service parameter structure. A pointer to the designated login service parameter structure is added into the allocated login service parameter portion structure is added, as well as a pointer to a next allocated login service parameter portion structure.

5 Claims, 3 Drawing Sheets

MAINTAINING IDENTIFIER INFORMATION IN A MEMORY USING UNIQUE IDENTIFIERS AS A LINKED LIST

BACKGROUND OF THE INVENTION

1. Invention

The present invention relates to high speed serial communication between computers and between computers, peripherals and other devices.

2. Previous Art

Fibre Channel (FC) is acn integrated set of standards developed by the American National Standards Institute (ANSI). FC is a set of standards that allows for a switching network, called a Fabric, to intelligently manage interconnections between a number of connection points, called N_Ports. All that is required of the N_Ports is to initiate a point-to-point connection between itself and a port (F_Port) of the Fabric. However, the presence of a Fabric is not necessary, as FC provides for topologies without a Fabric, as in the case of a simple point-to-point link between two N_Ports, or a Fibre-Channel Arbitrated Loop (FC-AL).

For a more complete description of the Fibre-Channel standard, reference should be made to the proposed drafts of the American National Standard for Information Systems, Fibre-Channel-Physical and Signaling Interface (FC-PH) Rev 4.3, Fibre-Channel-Physical and Signaling Interface-2 (FC-PH-2) Rev. 7.4, and Fibre-Channel -Physical and Signaling Interface-3 (FC-PH-3) Rev. 9.1 which are incorporated herewith in their entirety.

Communication between N_Ports is based on the transfer of Data frames and Link_-Control frames resulting from information transfer requests from other N_Ports. According to the FC standard, each N_Port is assigned a unique identifier to identify itself during communication. The primary function of the Fabric is to receive frames from a source N_Port and route the frames to a destination N_Port whose identifier is specified in the frames to be transmitted. Each N_Port also has a permanent identifier which is worldwide unique, and is called the Worldwide Name, or WWN, which is a portion of the login service parameter.

A number of classes of service are supported by the Fibre-Channel standard. These classes specify the method of connection between the N_Ports, the bandwidth available and the delivery integrity of the communication. The Fabric specifies the classes of services it supports in its service parameters (SP). To communicate with the Fabric or to another N_Port, an N_Port exchanges service parameters with the Fabric or with another N_Port by performing a Fabric Login Protocol or an N_Port Login Protocol, respectively. Conversely, when an N_Port wishes to sever communications between itself and the Fabric or between itself and another N_Port, it may request removal of its Service Parameters from the Fabric or from the other N_Port, by carrying out an F_Port or an N_Port Logout Protocol.

Login is long lived, and the number of N_Ports with which an N_Port may be logged in is only limited by the N_Port's available functionality and resources. A large server may potentially communicate with thousands of devices in a Fabric environment, which means the server port may have to login with thousands of N_Ports.

However, maintaining the login service parameters of thousands of logged-in N_Ports is costly in terms of memory storage requirements. Indeed, an N_Port or an F_Port login service parameter payload is 112 bytes, excluding the command code, and may be as many as 252 bytes, excluding the command code, as set forth in FC-PH-3, Rev. 9.1. The login service parameter includes the Common Service Parameters, the Port Name, the Node/Fabric Name, the Class 1,2 and 3 Service Parameters, the Vendor Version level and 16 reserved bytes. Upon completion of the login procedure, the service parameters must be stored permanently, until the F_Port and the N_Port, or the two N_Ports log each other out, either explicitly or implicitly.

In a large server environment, an FCP initiator N_Port talking to 1,000 FCP target N_Ports is not unusual. To store the 1000 associated service parameters alone requires 100K memory space. To commit over 100K memory space for storing service parameters alone is often not acceptable at all, especially when login services are performed at the firmware level of a Fibre-Channel solution.

What is needed, therefore, is a method for reducing the memory storage overhead required to keep track of the login service parameters. This will allow for an overall reduction in cost of the Fibre-Channel solution.

Likewise, in large networks of computers, computer peripherals and like devices, the interconnected devices often are assigned a unique identifier which defines the device's identification, characteristics and requirements. These unique identifiers must be maintained in memory, and the storage requirements for doing so can be quite burdensome in terms of system resources.

What is needed, therefore, is a method for reducing the amount of memory needed to maintain such unique identifiers, while not sacrificing access thereto or functionality.

SUMMARY OF THE INVENTION

It is, therefore, an object of the present invention to provide a method for reducing the memory storage overhead required to keep track of login service parameters that will allow for an overall reduction in cost of the a resulting solution.

It is another object of the present invention to provide a method for reducing the amount of memory needed to maintain a number of unique device identifiers in memory, while not sacrificing access thereto or functionality.

In accordance with the above objects and those that will be mentioned and will become apparent below, an exemplary embodiment of the method for maintaining login service parameters according to the present invention, comprises:

a step of allocating a login service parameter portion structure to store a login service parameter portion of a logged in port;

a step of copying the login service parameter portion of the logged in port into the allocated login service parameter portion structure;

a step of comparing the login service parameter of the logged in port with stored login service parameter structures;

if the login service parameter of the logged in port, except for a login service parameter portion thereof, is identical to one of the stored login service parameters, a step of:

adding a first pointer to one of the stored login service parameters structures into the allocated login service parameter portion structure; or if the logged in port login service parameter, except for a login service parameter portion thereof, is not identical with any stored login service parameters, the steps of:

designating a login service parameter structure for the logged in port;

writing the logged in port login service parameter into the designated login service parameter structure; and adding a first pointer to the designated login service parameter structure into the allocated login service parameter portion structure.

It is an advantage of this exemplary embodiment that the memory requirements for storing a plurality of login service parameter structures is reduced by storing a relatively small number of full login service parameters and a relatively greater amount of the login service parameter portion structures thereof, each of the login service parameter portion structures including a pointer pointing to a stored login service parameter.

In another exemplary embodiment, the designating step includes the steps of: determining whether a selectively predetermined memory limit has been reached; and if the selectively predetermined memory limit has been reached, utilizing a cache updating algorithm to identify a login service parameter structure which satisfies the algorithm, the login service parameter structure identified being the designated login service parameter structure; or if the predetermined memory limit has not been reached, allocating a login service parameter structure in memory as the designated login service parameter structure.

According to a still further embodiment of the present invention, the writing step comprises a step of overwriting the login service parameter structure identified using the cache updating algorithm.

According to another aspect of the invention, the cache updating algorithm is a Least-Recently-Used (LRU) cache updating algorithm.

According to another exemplary embodiment, the selectively predetermined memory limit is set to one of a smaller and a greater memory limit in the determining step.

According to yet another aspect of the present invention, the method further includes a step of invoking a PDISC Extended Link Service to re-initiate communication with a port whose login service parameter was overwritten.

According to a preferred embodiment of the present invention, a method of maintaining login service parameters, includes the steps of: storing login service parameters of logged in ports as a linked list of login service parameter portion structures, each member of the linked list pointing to one stored login service parameter structure and to a next member of the linked list, if the login service parameters of the logged in ports, except for login service parameter portions thereof, are identical with the one stored login service parameter structure; and creating a new linked list of login service parameter portion structures if none of the stored login service parameter structures are identical with a given login service parameter, except for the login service parameter portion thereof, of a logged in port. It is an advantage of this preferred embodiment that the storage requirements for storing a plurality of login service parameters is lessened by storing a plurality of login service parameter portion structures as at least one linked list of such structures, each member of the at least one linked list pointing to one stored login service parameter structure and to a next member of the linked list.

According to an exemplary embodiment, the one stored login service parameter structure is created by: allocating a login service parameter structure in memory; and copying a logged in port login service parameter into the allocated login service parameter structure.

According to yet another aspect of the invention, the linked list of login service parameter portion structures is created by iteratively: allocating a login service parameter portion structure in memory for each of the logged in ports; copying the login service parameter portion of each of the logged in ports into the respectively allocated login service parameter portion structures; adding a first pointer pointing to the one stored login service parameter structure into each of the allocated login service parameter portion structures; and adding a second pointer pointing to a next member of the linked list into each of the allocated login service parameter portion structures.

According to a further aspect of the present invention, the creating step further comprises the steps of: writing the given login service parameter of the logged in port to memory; and assigning to each login service parameter portion structure of the new linked list of login service parameter portion structures a first pointer pointing to the stored given login service parameter of the logged in port and a second pointer pointing to a next login service parameter portion structure of the new linked list of login service parameter portion structures.

The writing step may comprise the steps of: determining whether a selectively predetermined memory limit has been reached; and if the selectively predetermined memory limit has been reached, utilizing a cache updating algorithm to identify a login service parameter structure which satisfies the algorithm; and overwriting the identified login service parameter structure with the given login service parameter of the logged in port; or if the predetermined memory limit has not been reached, allocating a login service parameter structure in memory; and copying the given login service parameter of the logged in port into the allocated login service parameter structure.

According to a further preferred embodiment, a method of maintaining identifier information in a computer system wherein each constituent element of the system is assigned a unique identifier including a first part common to a plurality of the constituent elements of the system, and a second part individual to each element of the system, according to the present invention, comprises: a first storing step of storing a first part of a unique identifier of one of the constituent elements in memory; a second storing step of storing the unique identifiers of remaining constituent elements whose first parts match the first part of the stored unique identifier as a linked list of second parts, each member of the linked list including a first pointer pointing to the stored unique identifier first part and a second pointer pointing to a next member of the linked list.

It is an advantage of this preferred embodiment that, by maintaining the unique identifiers as a linked list of second parts, the memory storage requirement for maintaining the identifier information is less than a memory storage requirement for storing an entire unique identifier for each constituent element.

In another preferred embodiment, the method further comprises: a third storing step of storing a first part of a further unique identifier of one of the constituent elements whose first part does not match the first part of the stored unique identifier; a fourth storing step of storing the unique identifiers of remaining constituent elements whose first parts match the further unique first part as a linked list of second parts, each member of the linked list including a first pointer pointing to the further unique first part and a second pointer pointing to a next member of the linked list.

In a still further aspect, the method according to the present invention further comprises, between the second and third storing steps, a step of determining whether a selectively predetermined memory limit has been reached; and if the selectively predetermined memory limit has been reached, utilizing a cache updating algorithm to identify a stored unique identifier first part which satisfies the algorithm; and overwriting the identified unique identifier first part with the further unique identifier first part; or if the predetermined memory limit has not been reached, proceeding with the third storing step.

In a still further preferred embodiment of the present invention, the method for maintaining Fibre-Channel login service parameters comprises: a step of comparing login service parameters of logged in ports with login service parameter structures stored in memory; if the login service parameters of the logged in ports, except for login service parameter portions thereof, are identical with one of the stored login service parameters, a step of: storing the login service parameters of the logged in ports as a linked list of login service parameter portion structures, each member of the linked list pointing to the one stored login service parameter and to a next member of the linked list; and if none of the stored login service parameter are identical with a given login service parameter, except for the login service parameter portion thereof, of a logged in port, a step of writing the given login service parameter of the logged in port in memory; and creating a new linked list of login service parameter portion structures, each member of the new linked list pointing to the stored given login service parameter of the logged in port and to a next member of the new linked list.

BRIEF DESCRIPTION OF THE DRAWING

For a further understanding of the objects and advantages of the present invention, reference should be had to the following detailed description, taken in conjunction with the accompanying drawings, wherein.

DETAILED DESCRIPTION OF THE INVENTION

Figure 1:
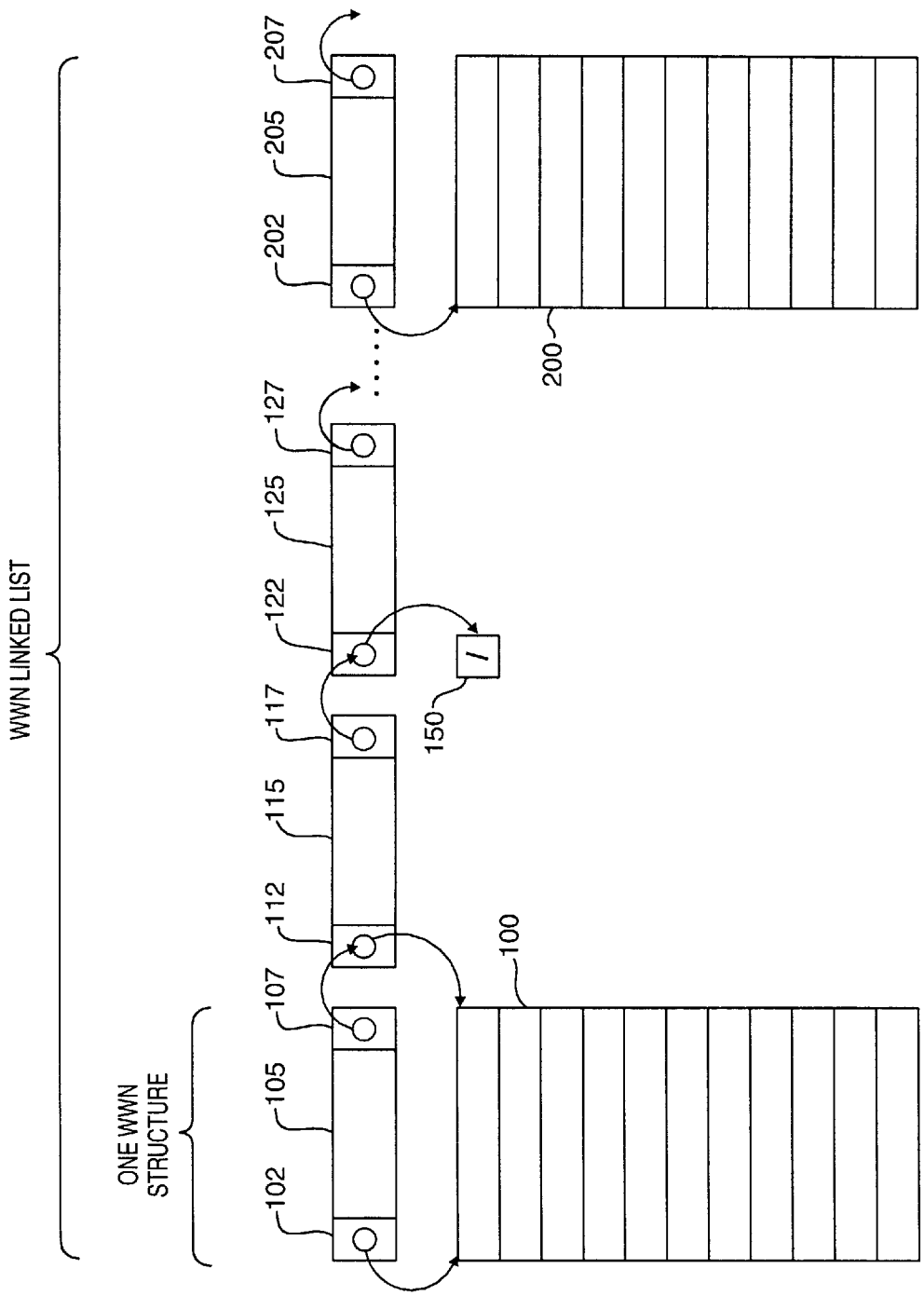
FIG. 1 is a logical diagram of the method according to the present invention.

FIG. 1 shows a logical diagram of the method according to the present invention. In particular, FIG. 1 shows the memory space used for storing 1,000 N_Ports' login service parameters, using the method according to the present invention. Reference numeral 100 represents a login service parameter structure stored in memory. Reference numeral 200 represents another login service parameter structure stored in memory. Reference numeral 105 represents a Worldwide Name for N_Port 1, reference 115 and 125 represent Worldwide Names for N_Ports 2 and 3, respectively. A Worldwide Name (hereafter WWN), as defined in FC-PH rev. 4.3, Clause 19.3.2, is a Name Identifier which is worldwide unique, and is a 64 bit unsigned binary value in the preferred embodiment. Reference numerals 102,105 and 107 collectively represent one WWN structure according to the present invention, namely, the WWN structure for N_Port 1. Reference numerals 112, 115 and 117 collectively represent the WWN structure for N_Port 2, reference numerals 122,125 and 127 represent the WWN structure for N_Port 3, and reference numerals 202,205 and 207 represent the WWN structure for N_Port 1,000. Each of the WWN structures includes a memory space for the WWN of a respective N_Port. Indeed, 115 represents the space for the WWN of N_Port 1, 115 the space for the WWN of N_Port 2, 125 the space for the WWN of N_Port 3 and 205 the space for the WWN of N_Port 1,000.

Each WWN structure also contains additional memory space for linking with the actual login service parameter structures stored in memory. Indeed, reference 102 represents additional memory space for linking the WWN structure for N_Port 1 to the login service parameter structure 100, the link being represented by the arrow pointing from the space 102 to the login service parameter structure 100. This link can, according to the present invention, be a pointer to the login service parameter structure 100 from the WWN structure composed of the WWN 105 for N_Port 1, space 102 and space 107. As can be seen in FIG. 1, space 112 includes a pointer pointing to the login service parameter structure 100. Similarly, space 202 includes a pointer pointing to the login service parameter structure 200.

The WWN structures shown in FIG. 1 are stored as a linked list. Indeed, each member of the linked list, namely, each WWN structure also contains a pointer linking it to the next member of the linked list. For example, the WWN structure for N_Port 1 includes a space 107 containing a pointer linking it to the next member of the linked list, namely, the WWN structure for N_Port 2 composed of space 112, the WWN for N_Port 2, and space 117. This linking is represented by the arrow from space 107 to space 112 of the WWN structure for N_Port 2. This linking may be a pointer to the memory address of the next member of the linked list.

The present invention takes advantage of the fact that a number of login service parameter structures for the Ports are identical, except for the WWN, which is, by definition, worldwide unique. As shown in FIG. 1, the login service parameter structure for N_Port 2 is identical with the already stored login service parameter structure of N_Port 1, except for its WWN. Therefore, no new storage is needed, as it is not necessary to store redundant information. According to the present invention, to store the login service parameter structure for N_Port 2, it is sufficient to store only the WWN structure for N_Port 2, and add a pointer to the login service parameter structure 100. To create the linked list, the WWN structure of N_Port 1 is linked, by a pointer, to the WWN structure for N_Port 2, the pointer being represented in FIG. 1 as the arrow joining memory spaces 107 and 112. In this manner, both WWN structures for N_Ports 1 and 2 point to the same stored login service parameter structure 100.

If none of the existing stored login service parameter structures matches a newly logged in N_Port's service parameter, a new login service parameter structure will be dynamically allocated in memory, and the login service parameter of the newly logged in N_Port will be copied therein. A pointer to this new structure will be added to the newly logged in N_port's WWN structure in the linked list. An example of this is shown relative to N_Port 1000. N_Port 1,000's login service parameter does not match the login service parameter for Port 1, namely login service parameter structure 100. Therefore, a new login service parameter structure 200 is dynamically allocated in memory, and the login service parameter for N_Port 1,000 is copied therein. The WWN structure for N_Port 1,000 is represented by reference numeral 202, 205 and 207. Reference 205 represents the WWN of N_Port 1,000. Space 202 represents memory space containing the pointer pointing to the login service parameter structure 200. Space 207 represents a space for a pointer pointing to the next member of the new linked list, namely other WWN structures which share the same login service parameter structure as that of N_Port 1,000, except for the WWN which is unique to that Port.

It is seen that the memory requirements for storing login service parameters according to the present invention are lessened, as compared to the memory requirements for storing the entire login service parameter structures for each logged in N_Port. Indeed, as the login service parameter structures contain a great deal of identical information, it is not necessary to repetitively store such redundant information. It is more economical, in terms of memory storage requirements, to store the login service parameters as linked lists of WWN structures, each member of the linked list pointing to a stored login service parameter structure, as well as to a next member in the linked list.

However, additional savings in memory storage requirements can be achieved according to the present invention. Indeed, the method according to the present invention further limits the number of login service parameter structures that can be allocated dynamically. This limit can be selectively predetermined. When the limit is reached, an existing login service parameter structure can be overwritten with a new one. The criteria for identifying the existing stored login service parameter structure to overwrite can be based upon any typical cache updating algorithm. One useful cache updating algorithm, in the context of the present invention, is the Least-Recently-Used cache updating algorithm, or LRU. The LRU algorithm, as its name implies, identifies the entry (in this case, the login service parameter structure) that has been the least recently used. Of course, other cache updating algorithms may be used, and the present invention should not be seen to be limited to any one type or class of cache updating algorithms or other criteria for selecting an appropriate login service parameter structure to overwrite. Once identified, the stored login service parameter structure is overwritten with the newly logged in N_Port's login service parameter. The overwritten login service parameter can, however, be retrieved later when the N_Port whose login service parameter was overwritten is accessed, via PDISC Extended Link Service. The thus retrieved login service parameter may be stored in memory by overwriting another N_Port's login service parameter by invoking, once again, a suitable cache updating algorithm. The first pointer in the WWN structure can indicate whether the N_Port's login service parameter is stored in memory or not. In FIG. 1, the pointer from space 122 of the WWN structure for N_Port 3 does not point to an existing login service parameter structure, but to location 150, indicating that the login service parameter structure for N_Port 3 is not stored in memory.

Figure 2:
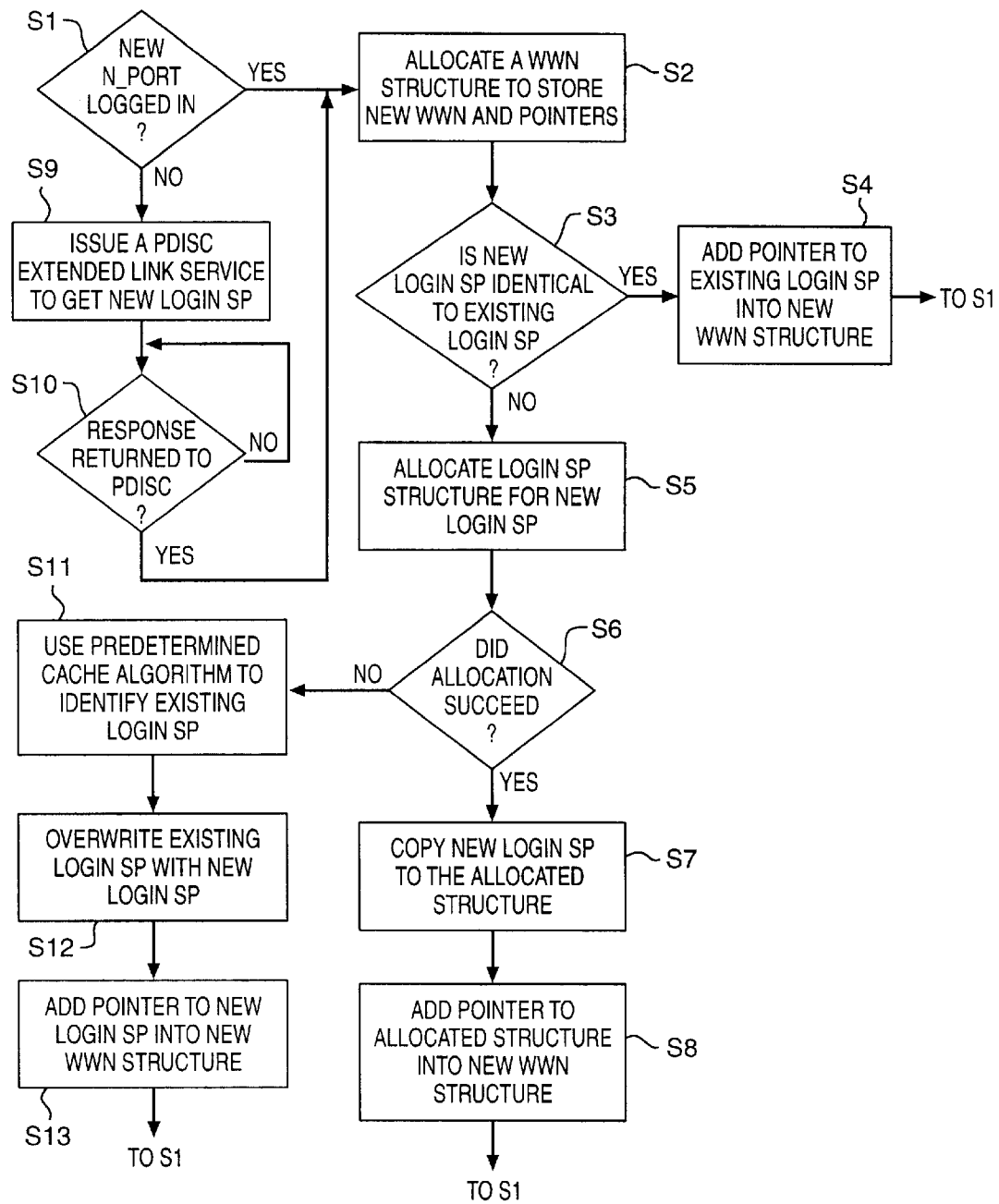
FIG. 2 is a flow chart illustrating the method for maintaining login service parameters according to the present invention.

Reference is now made to FIG. 2 for a description of an implementation of the method according to the present invention.

In Step S1, it is determined whether a new N_Port is logged in or not. If a new N_Port is logged in (yes branch), step S2 is carried out, wherein a WWN structure is allocated in memory to store the WWN of the newly logged in N_Port, as well as additional space for the pointers pointing to a login service parameter structure and to the next member of the linked list. The method then proceeds to step S3, wherein it is determined whether the login service parameter of the newly logged in N_Port is identical with an existing stored login service parameter structure. If the login service parameter of the newly logged in N_Port is indeed identical with an existing stored login service parameter structure (yes branch), a pointer to the existing stored login service parameter structure is added to the allocated WWN structure of the newly logged in N_Port, as shown in step S4. In FIG. 1, this is the case with N_Port 2's WWN structure, whose login service parameter, except for the WWN, matches that of N_Port 1. Therefore, a pointer pointing from N_Port 2's WWN structure space 112 points to login service parameter structure 100.

If the login service parameter of the newly logged in N_Port is not identical with an existing stored login service parameter structure (no branch of step S3), an attempt is made to allocate, in step S5, a new login service parameter structure in memory for the login service parameter of the newly logged in N_Port. If the allocation succeeds (yes branch of step S6), the login service parameter of the newly logged in N_Port is copied into the allocated login service parameter structure, as shown in step S7. A pointer is then added to the newly allocated login service parameter structure into the new WWN structure. This is the case, in FIG. 1, of login service parameter structure 200 for N_Port 1,000. A pointer is added to the WWN structure for Port 1,000, pointing to the login service parameter structure 200. A new login service parameter structure 200 was allocated because the login service parameter of N_Port 1,000 did not match any of the existing stored login service parameters, such as login service parameter 100.

It is possible that an allocation of a new login service parameter structure in memory for the login service parameter of a newly logged in N_Port does not succeed (no branch of step S6), because a selectively predetermined memory limit has been reached or exceeded. This selectively predetermined memory limit may be reconfigured to set either a smaller or a greater memory limit. If the allocation fails (no branch of S6), the method according to the present invention proceeds to step S11. In step S11, a predetermined cache updating algorithm is used to identify an existing stored login service parameter structure. Such a cache updating algorithm may identify, for example, the least recently used login service parameter structure, using a Least-Recently-Used (LRU) cache updating algorithm The identified existing stored login service parameter structure is then overwritten, in step S12, with the login service parameter structure of the newly logged in N_Port. A pointer is then added to the new login service parameter structure into the WWN structure of the newly logged in N Port, as indicated by step S13.

The method according to the present invention then, from step S13, returns to Step S1, as it does from steps S4 and S8.

To communicate with the Fabric or to another N_Port, an N_Port must exchange its service parameter with the Fabric or with another N_Port by performing a Fabric Login Protocol or an N_Port Login Protocol, respectively. If, in the present invention, an N_port is accessed, but its login service parameter structure is no longer stored in memory as it has been previously overwritten, it is unable to exchange its service parameter with either the Fabric or another N_Port. It is thus necessary, to reacquire its login service parameter structure. This is done by a step of invoking at least a PDISC Extended Link Service to re-initiate communication with an N_Port whose existing login service parameter was overwritten, as in step S9. The method according to the present invention then waits until the response to PDISC is returned (no branch of step S10). When the response is returned, the method according to the present invention proceeds again with Step S2, and a new WWN structure is allocated.

The method according to the present invention dramatically reduces the memory space needed to keep track of login service parameters for a server N_Port or an FCP initiator, by as much as 80%. Of course, this drastic reduction in the memory overhead requirements for storing login service parameters also reduces the overall cost of Fibre-Channel solutions The method is particularly adapted to working in a homogeneous environment, where most N_Ports with which the server is logged in share identical operating parameters.

Using the method according to the present invention, the actual amount of memory needed for maintaining a large number of login service parameters can be limited to a predetermined amount based on the operating environment and the amount of memory resources available for the Fibre-Channel control software. As an illustrative example, compared with 116,000 bytes needed to store 1,000 port's N_Port login service parameters individually, (112 bytes for each N_Port login service parameter, plus four for linked list maintenance per port), the method according to the present invention demonstrates the following results:

1) In a homogeneous environment where all logged in N_Ports share the same login service parameter, except for the WWN portion thereof, the method according to the present invention needs only 24,112 bytes to store all N_Port login service parameters (24 bytes for the WWN structure per port, including a pointer for the next member in the linked list and a pointer to the existing stored login service parameter structure. For 1,000 ports, this amounts to 24,000 bytes. Only one N_Port login service parameter structure is needed, which takes 112 bytes). This translates to a savings in memory space required of almost 80%, compared with the 116,000 bytes necessary to store 1,000 N_Port login service parameters individually.

2) If every N_Port login service parameter is unique, the present inventive method allows the imposition of a predetermined ceiling value to limit the actual number of login service parameter structures to be stored, without, however, limiting the number of N_Ports that can be accessed. The selectively predetermined memory limit could be dynamically set based on the available resource, functionality, and real time performance of the Fibre-Channel control software. If the limit is set at 100, the total number of bytes needed is 24,000+112×100=35,200 bytes, a savings of 70% relative to the 116,000 bytes necessary to store 1,000 N_Port login service parameters individually.

Although the present invention finds particular application in a Fibre-Channel environment, it is by no means limited thereto. Indeed, the method according to the present invention is applicable to any computing system, environment or standard wherein each constituent element of the system is assigned a unique identifier, and must exchange at least a portion of that unique identifier with the other constituent members of the system in order to exchange information therewith. The present inventive method is applicable to any system wherein the unique identifier includes a first part common to a plurality of the constituent elements of the system, and a second part individual to each element of the system. Likewise, the present invention is applicable to any environment in which information, whether called login service parameters, WWNs or some other names, regarding particular devices or modules must be exchanged before communication can take place.

Figure 3:
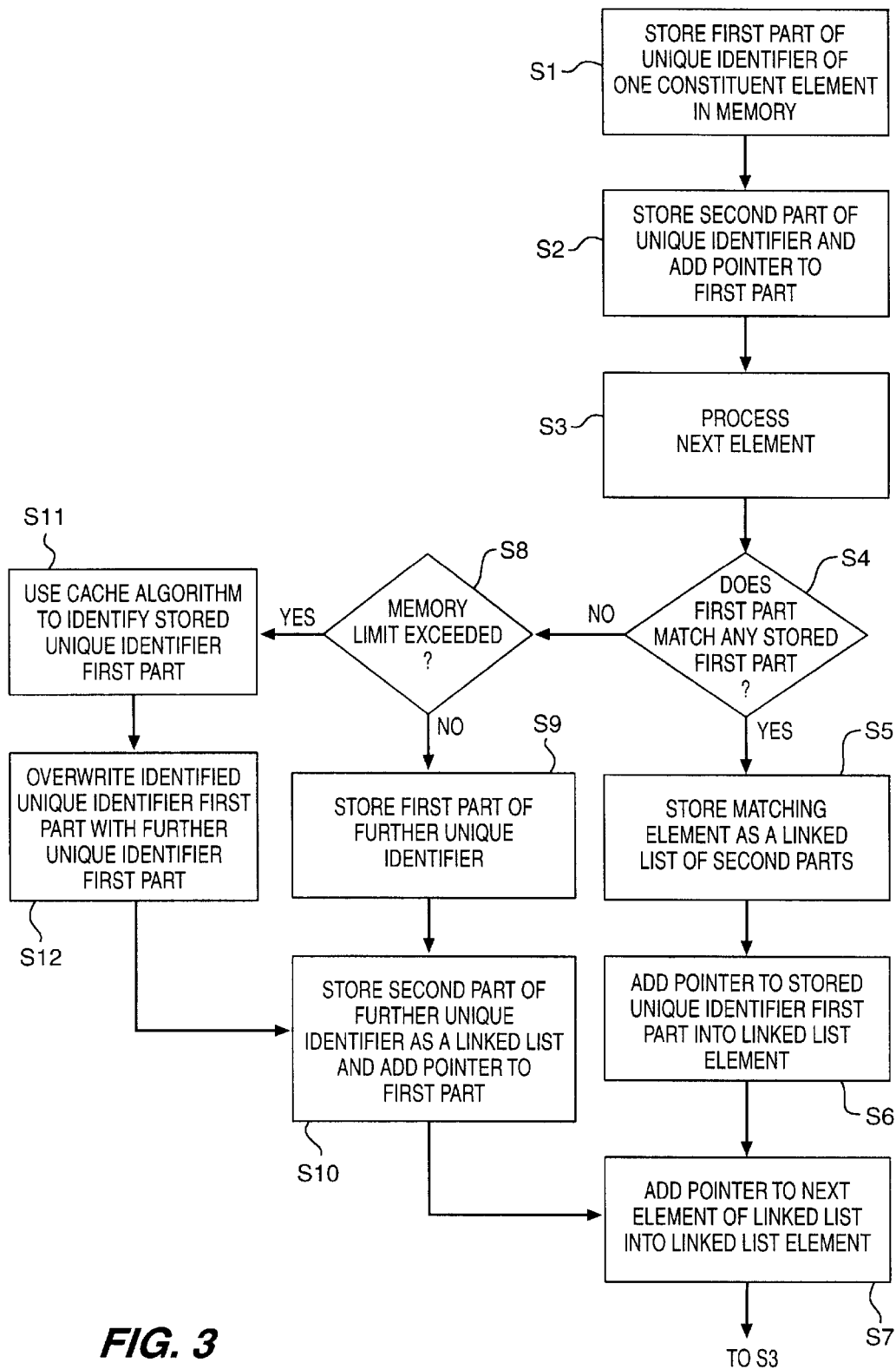
FIG. 3 is a flow chart illustrating the method for maintaining identifier information in memory according to the present invention.

As shown in FIG. 3, another embodiment of the present inventive method begins with step S1, in which a first part of a unique identifier of one of the constituent elements is stored in memory. Then, in S2, a second storing step of storing the second part of the unique identifier is carried out, together with a step of adding a pointer to the unique identifier first part. In S3, the next element is processed. In Step S4, a decision is made whether the first part of the unique identifier of the next element matches any stored first part. If yes, in step S5, the unique identifier of the next element is stored as a linked list of second parts by adding a pointer to the stored unique identifier first part, as in step S6, and by adding a pointer to the next element of the linked list, as in step S7. Step S3 is then repeated.

In step S8, it is determined whether a selectively predetermined memory limit has been reached or exceeded, and if the selectively predetermined memory limit has been reached or exceeded (yes branch of S8), a cache updating algorithm is used to identify a stored unique identifier first part which satisfies the algorithm, as in S11. The identified unique identifier first part is overwritten with a further unique identifier first part in step S12. In step S9, if the predetermined memory limit has not been reached, the first part of the unique identifier is stored, and step S10 and S7 are repeated as before.

The foregoing preferred embodiment reduces the memory storage requirements by taking advantage of the highly redundant nature of the unique identifiers by storing their second parts as a linked list and by utilizing a cache updating algorithm to limit the total number of unique identifier first parts stored in memory.

While the foregoing detailed description has described several embodiments of the present invention, it is to be understood that the above description is illustrative only and not limiting of the disclosed invention. Those of skill in this art will undoubtedly make various modifications to the present invention, and all such modifications should to be deemed to fall within the spirit of the present invention. Thus, the invention is to be limited only by the claims as set forth below.

What is claimed:

1. A method of maintaining identifier information in a computer system wherein each constituent element of the system is assigned a unique identifier including a first part common to a plurality of the constituent elements of the system, and a second part individual to each element of the system, comprising:

a first storing step of storing a first part of a unique identifier of one of the constituent elements in memory;

a second storing step of storing the unique identifiers of remaining constituent elements whose first parts match the first part of the stored unique identifier as a linked list of second parts, each member of the linked list including a first pointer pointing to the stored unique identifier first part and a second pointer pointing to a next member of the linked list, whereby, by maintaining the unique identifiers as a linked list of second parts, a memory storage requirement for maintaining the identifier information is less than a memory storage requirement for storing an entire unique identifier for each constituent element.

2. A method according to claim 1, further comprising:

a third storing step of storing a first part of a further unique identifier of one of the constituent elements whose first part does not match the first part of the stored unique identifier;

a fourth storing step of storing the unique identifiers of remaining constituent elements whose first parts match the further unique first part as a linked list of second parts, each member of the linked list including a first pointer pointing to the further unique first part and a second pointer pointing to a next member of the linked list.

3. A method according to claim 2, further comprising:

between the second and third storing steps, a step of determining whether a selectively predetermined memory limit has been reached; and if the selectively predetermined memory limit has been reached, utilizing a cache updating algorithm to identify a stored unique identifier first part which satisfies the algorithm; and overwriting the identified unique identifier first part with the further unique identifier first part; or if the predetermined memory limit has not been reached, proceeding with the third storing step.

4. The method of claim 3, wherein the cache updating algorithm is a Least-Recently-Used (LRU) cache updating algorithm.

5. The method of claim 3, further comprising a step of reconfiguring the selectively predetermined memory limit to set one of a smaller and a greater memory limit in the determining step.

* * * * *